(12) United States Patent
Sexton et al.

(10) Patent No.: US 8,846,797 B2
(45) Date of Patent: Sep. 30, 2014

(54) METALLIC INK COMPOSITION AND WRITING INSTRUMENT CONTAINING SAME

(71) Applicants: Martin N. Sexton, Sugar Grove, IL (US); Wing Sum Vincent Kwan, Chicago, IL (US)

(72) Inventors: Martin N. Sexton, Sugar Grove, IL (US); Wing Sum Vincent Kwan, Chicago, IL (US)

(73) Assignee: Sanford, L.P., Downers Grove, IL (US)

( * ) Notice: Subject to any disclaimer, the term of this patent is extended or adjusted under 35 U.S.C. 154(b) by 71 days.

(21) Appl. No.: 13/732,118

(22) Filed: Dec. 31, 2012

(65) Prior Publication Data

US 2014/0186529 A1    Jul. 3, 2014

(51) Int. Cl.
| | | |
|---|---|---|
| C08K 3/08 | (2006.01) | |
| C08K 3/20 | (2006.01) | |
| C08K 5/01 | (2006.01) | |
| C09D 11/10 | (2014.01) | |
| C09D 11/17 | (2014.01) | |
| B43K 1/00 | (2006.01) | |
| C09D 11/16 | (2014.01) | |

(52) U.S. Cl.
CPC ............... *C09D 11/17* (2013.01); *B43K 1/006* (2013.01); *C09D 11/16* (2013.01)
USPC ........... 524/449; 524/430; 524/440; 524/441; 523/161; 401/196; 427/429

(58) Field of Classification Search
CPC ........... C08L 93/00; C08L 93/04; C08K 3/08; C08K 3/20; C08K 5/01; C09D 11/10
USPC ............... 524/440, 441, 430, 449; 106/31.72, 106/31.73, 31.74, 31.88, 31.9; 523/161
See application file for complete search history.

(56) References Cited

U.S. PATENT DOCUMENTS

| | | | |
|---|---|---|---|
| 4,545,819 | A | 10/1985 | Shioi et al. |
| 4,657,591 | A | 4/1987 | Shioi et al. |
| 4,857,624 | A | 8/1989 | DeBlasi et al. |
| 5,474,603 | A | 12/1995 | Miyashita et al. |
| 5,762,694 | A | 6/1998 | Yokoi et al. |
| 5,877,235 | A | 3/1999 | Sakuma et al. |
| 6,063,176 | A | 5/2000 | Lyen et al. |
| 6,083,311 | A | 7/2000 | Kanbayashi et al. |
| 6,099,629 | A | 8/2000 | Morita et al. |
| 6,120,590 | A | 9/2000 | Miyamoto et al. |
| 6,171,381 | B1 | 1/2001 | Yoshimura et al. |
| 6,224,284 | B1 | 5/2001 | Sukhna et al. |
| 6,402,412 | B2 | 6/2002 | Sukhna et al. |
| 6,524,382 | B1 | 2/2003 | Bujard et al. |
| 6,533,857 | B1 | 3/2003 | Schmid et al. |
| 6,544,323 | B2 | 4/2003 | An et al. |
| 6,561,713 | B2 | 5/2003 | Sukhna et al. |
| 6,599,353 | B2 | 7/2003 | Spencer et al. |
| 6,616,741 | B1 | 9/2003 | Sawa et al. |
| 6,663,704 | B2 | 12/2003 | Spencer et al. |
| 6,706,103 | B2 | 3/2004 | Yoshimura et al. |
| 6,730,154 | B2 | 5/2004 | Inoue et al. |
| 6,730,717 | B2 | 5/2004 | Yoshimura et al. |
| 6,749,676 | B2 | 6/2004 | Spencer et al. |
| 6,770,689 | B1 | 8/2004 | Yoshimura et al. |
| 7,018,122 | B2 | 3/2006 | Kwan et al. |
| 7,135,507 | B2 | 11/2006 | Sexton |
| 7,297,729 | B2 | 11/2007 | Sexton et al. |
| 7,455,724 | B2 | 11/2008 | Kwan et al. |
| 7,829,630 | B2 | 11/2010 | Deshpande et al. |
| 2001/0003262 | A1 | 6/2001 | Yoshimura et al. |
| 2001/0019682 | A1 | 9/2001 | Sukhna et al. |
| 2002/0007768 | A1 | 1/2002 | Yoshimura et al. |
| 2002/0033116 | A1 | 3/2002 | Spencer et al. |
| 2002/0033117 | A1 | 3/2002 | Inoue et al. |
| 2002/0096083 | A1 | 7/2002 | Spencer et al. |
| 2002/0128350 | A1 | 9/2002 | Yoshimura et al. |
| 2002/0148387 | A1 | 10/2002 | An |
| 2002/0197096 | A1 | 12/2002 | Sukhna et al. |
| 2003/0041776 | A1 | 3/2003 | Spencer et al. |
| 2003/0129015 | A1 | 7/2003 | Sexton |
| 2003/0212179 | A1 | 11/2003 | Yadav et al. |
| 2003/0215281 | A1* | 11/2003 | Sexton et al. ............... 401/261 |
| 2004/0173121 | A1 | 9/2004 | Fukuo et al. |
| 2005/0148685 | A1 | 7/2005 | Yamamoto |
| 2005/0159505 | A1 | 7/2005 | Yoshimura et al. |
| 2009/0324983 | A1* | 12/2009 | Hackbarth et al. ............ 428/551 |
| 2010/0239750 | A1 | 9/2010 | Brenton et al. |
| 2011/0179971 | A1 | 7/2011 | Proelss et al. |

FOREIGN PATENT DOCUMENTS

| | | |
|---|---|---|
| EP | 1095991 A1 | 5/2001 |
| JP | S5991161 A | 5/1984 |
| JP | 2000129188 A | 5/2000 |
| JP | 2001354893 | 12/2001 |
| JP | 2003128974 | 5/2003 |

(Continued)

OTHER PUBLICATIONS

High-Performance Metallics Gold for Printing Inks brochure, Schlenk Metallpulver GMGH & Co. KG (2 pages) (printed Mar. 2006).

P-03 Resin, Terpene Phenolic Resin, Akrochem Corporation (1 page) (publicly available before Dec. 29, 2011).

P-104 Resin Product Sheet, Akrochem Corporation (2 pages) (publicly available before Dec. 29, 2011).

Pentalyn 702-M Rosin Resin Product Data Sheet, Eastman Chemical Co. (1 page) (Sep. 19, 2006).

(Continued)

*Primary Examiner* — Vu A Nguyen

(74) *Attorney, Agent, or Firm* — Marshall, Gerstein & Borun LLP

(57) ABSTRACT

Metallic ink compositions for use in capillary-action markers are provided. More particularly, a metallic ink composition includes an organic solvent, a metallic pigment, and a resin component.

40 Claims, No Drawings

(56) References Cited

FOREIGN PATENT DOCUMENTS

| JP | 2003221542 | 8/2003 |
|---|---|---|
| WO | WO-01/16236 | 3/2001 |
| WO | WO-03/044104 | 5/2003 |
| WO | WO-2010/069823 A1 | 6/2010 |
| WO | WO-2013/101738 A1 | 7/2013 |

OTHER PUBLICATIONS

Pigments for Coatings, World of Metallics, Aluminum & Goldbronze Pigments brochure, Schlenk Metallpulver GMBH & Co. KG (19 pages) (printed Jan. 2010).
Pigments for Printing Inks, World of Metallics Pigments brochure (20 pages) (printed Mar. 2011).
Setaprint™ 1200E Phenolic Modified Rosin Resin product sheet, Lawter Inc. (1 page) (updated Mar. 19, 2012).
Setaprint™ 2404E Phenolic Modified Rosin Resin product sheet, Lawter Inc. (1 page) (updated Mar. 19, 2012).
STAPA 15 VS Aluminum Paste Safety Data Sheet, Eckart America Corporation (9 pages) (printed May 30, 2011).
STAPA 20 Aluminum Paste, Eckart America Corporation (1 page) (Date?).
Styrenated Terpene Resin, Summit Trade (1 page) (publicly available before Dec. 29, 2011).
Sylvares® TP 105 Product Data Sheet, Arizona Chemical (1 page) (Jul. 2009).
Sylvares® TP 2019 Product Data Sheet, Arizona Chemical (2 pages) (Jan. 2005).
Sylvares® TP 2040HME Product Data Sheet, Arizona Chemical (1 page) (Jul. 2009).
Sylvares® TP 2040LO Product Data Sheet, Arizona Chemical (1 page) (publicly available before Dec. 29, 2011).
Sylvares® ZT106LT Resin Product Data Sheet, Arizona Chemical (2 pages) (Jan. 2005).
Tamanol 803L, Terpene Phenolic Resin, Multiple Plus Ltd. (1 page) (publicly available before Dec. 29, 2011).
Terlon® 303A, Ink Resins, Vehicles and Additives Product Guide, Lawter Inc. (8 pages) (2011).
Zonatac® NG 98 Product Data Sheet, Arizona Chemical (2 pages) (Jan. 10, 2007).
International Search Report and Written Opinion, corresponding International Application No. PCT/US13/78199, mailing date Mar. 27, 2014.

* cited by examiner

METALLIC INK COMPOSITION AND WRITING INSTRUMENT CONTAINING SAME

BACKGROUND

1. Field of the Invention

The invention relates generally to metallic ink compositions for use in capillary-action markers. More particularly, the invention relates to a metallic ink composition comprised of an organic solvent, a metallic pigment, and a resin component.

2. Brief Description of Related Technology

Writing instruments capable of making written markings containing metallic pigments are known. For example, valve-action markers capable of making written markings containing metallic pigments have been developed. Typically, such valve-action markers utilize a spring-loaded nib, which opens a valve to an ink reservoir when depressed (e.g., against a writing surface), thereby allowing the ink to flow from the ink reservoir to the nib.

Valve-action markers require more parts than conventional capillary-action markers, and consequently their manufacture is more complicated and costly. Additionally, valve-action markers are problematic in that the metallic pigments tend to settle to the bottom of the ink reservoir when the valve-action markers are not in use. Therefore, the user typically often has to violently shake the marker prior to using same in order to effect distribution of the metallic pigments throughout the ink composition so as to ensure that the ink composition delivered to the marker nib contains sufficient amounts of metallic pigment to produce the desired visual effect. Moreover, the user typically has no means to verify that the metallic pigment has been adequately distributed throughout the ink composition without writing with the marker because the marker barrel is opaque. The user must also subsequently depress the nib against a writing surface to open the valve to the ink reservoir and allow delivery of the ink composition to the nib as described above. In view of the foregoing, other means of delivering metallic ink compositions are desired.

Conventional capillary-action markers typically contain a fibrous ink reservoir and a nib in fluid communication therewith. Such markers typically include an ink composition having a low viscosity because the adhesive forces (between the ink composition and the channel walls of the reservoir and/or nib) must exceed the cohesive forces of the ink composition to permit movement of the composition by capillary-action. Incorporating metallic pigments (e.g., including various metallic pigments such as aluminum and bronze flakes) into the low viscosity ink compositions used in capillary-action markers is often challenging because such metallic pigments tend to settle out of the ink compositions as set forth above. Even when the metallic pigments are adequately suspended in the ink compositions, the marker's fibers frequently undesirably filter the metallic pigments and become clogged over time. Accordingly, over time, the marker can be rendered incapable of making written markings containing metallic pigments.

U.S. Pat. No. 6,120,590 to Miyamoto discloses a ball point pen containing a water-based, thixotropic gel ink having metallic lustrous color. Such thixotropic gel inks, however, are too viscous to be successfully adapted for use in many writing instruments, including conventional capillary-action markers.

Capillary action markers including inks containing metallic pigments are, however, known in the art. U.S. Pat. No. 7,135,507 to Sexton discloses a capillary action marker containing an ink including an aqueous dispersion of a metallic pigment and a specific hydantoin-formaldehyde co-polymer film-forming resin, optionally together with one or more of a color agent, a pH-adjusting agent, anti-settling agent, or a preservative. Additionally, U.S. Pat. No. 7,297,729 to Sexton discloses a capillary action marker containing an ink including a nitro solvent, a film-forming resin, a pigment or dye, and optionally, a substrate wetting agent. Still further, U.S. Pat. No. 6,402,412 to Sukhna discloses an aqueous ink for a capillary action marker including a permanent water-based binder, a colored pigmented permanent water-based dispersion of sub-micron particle size, an aluminum dispersion of specific particle size, a humectant, a surfactant, an anti-settling additive, a preservative and a pH adjuster. Too frequently, however, capillary action markers containing known ink formulations do not deliver a substantially homogenous ink composition for a reasonable amount of time (much less so over the lifetime of the product) and tend to clog, particularly when commercially available bronze pigments are utilized in the ink formulations. Such problems are believed in part to be attributable to the density, size, morphology, and surface treatment of the metallic pigments often used in writing compositions.

SUMMARY

The invention provides a metallic ink composition comprising an organic solvent, a metallic pigment dispersed in the solvent, and a resin component dissolved in the solvent, wherein the ink composition has a pigment to resin component ratio between about 0.70 and about 2.00, and the resin component has a mean hydroxyl number between about 20 and about 120.

In a related aspect, the invention provides a capillary-action marker comprising an ink reservoir and a porous nib in fluid communication with the ink reservoir, the ink reservoir containing a metallic ink composition in accordance with the invention.

In another related aspect, the invention provides a method of making a written mark with a metallic ink composition comprising the steps of providing a capillary-action marker comprising an ink reservoir and a porous nib in fluid communication with the ink reservoir, the ink reservoir containing a metallic ink composition in accordance with the invention, and contacting the nib of the capillary-action marker to a substrate surface to make a written mark.

Further aspects of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to specific embodiments described herein.

DETAILED DESCRIPTION

The invention provides a metallic ink composition comprising an organic solvent, a metallic pigment dispersed in the solvent, and a resin component, wherein the pigment to resin component ratio is between about 0.70 and 2.00. The resin component has a mean hydroxyl number between about 20 and about 120.

Surprisingly and unexpectedly, the present inventors found that the priming of a porous nib of a capillary action marker was significantly affected by the pigment to resin component ratio and the mean hydroxyl number of the resin component. The combination of a pigment to resin component ratio between about 0.70 and 2.00 and a mean hydroxyl number between about 20 and about 120 has been found to be particularly advantageous in facilitating the delivery of a substantially homogeneous ink composition containing a metallic pigment with the end result being that any written markings (made using a writing instrument, particularly a capillary action marker, containing a metallic ink composition according to the invention) generally include a regular/uniform/homogeneous amount of metallic pigment and therefore demonstrate a desired decorative effect over substantially the entire lifetime of the product. Specifically, by providing metallic ink compositions containing pigment to resin component ratios and having mean hydroxyl ratios within the foregoing ranges, the metallic ink compositions are capable of priming the nibs of capillary action markers with metallic pigment such that unacceptable failure due to "overpriming" (which is believed to result in the porous nib becoming overclogged such that insufficient ink composition is delivered from the nib to wet the substrate when a written mark is attempted) and unacceptable failure due to under-priming (which is believed to be attributable to the pigment becoming undesirably fixed within the fibrous ink reservoir because of undesirable interactions between the metallic pigment and the ink reservoir fibers such that little metallic pigment is delivered from the nib to the substrate when a written mark is attempted) are beneficially avoided.

In particular, the metallic ink compositions according to the invention demonstrate unexpectedly advantageous performance when the metallic ink compositions include bronze (copper alloy) metallic pigments that provide a "gold", "gold-bronze", or "bronze" decorative effect when applied to a substrate, and the pigment to resin component ratio is between about 0.70 and 2.00 and the mean hydroxyl number of the resin component is between about 30 and about 70. It is believed that the pigment to resin component ratio and the resin mean hydroxyl number in the ink compositions according to the invention are particularly useful with substantially planar bronze/copper alloy metallic pigments as disclosed herein because of their density, size, morphology, and surface treatment (and the manner in which these parameters affect the writing performance of a writing instrument, in particular a capillary action marker, containing the ink compositions), but of course, other metallic pigments, particularly metallic pigments treated with a long chain (18 to 21 carbons) fatty acid such as stearic acid, oleic acid, and the like, may also be used.

The invention provides a capillary-action marker comprising an ink reservoir and a porous nib in fluid communication with the ink reservoir, the ink reservoir containing a metallic ink composition comprising an organic solvent, a metallic pigment dispersed in the solvent, and a resin component dissolved in the solvent, wherein the pigment to resin component ratio is between about 0.70 and 2.00, and the resin component has a mean hydroxyl number between about 20 and about 120.

The invention further provides a method of making a written mark with a metallic ink composition in accordance with the invention, the method comprising: providing a capillary-action marker comprising an ink reservoir and a porous nib in fluid communication with the ink reservoir, the ink reservoir containing a metallic ink composition comprising an organic solvent, a metallic pigment dispersed in the solvent, and a resin component dissolved in the solvent, wherein the pigment to resin component ratio is between about 0.70 and 2.0, and the resin component has a mean hydroxyl number between about 20 and about 120; and contacting the nib of the capillary-action marker to a substrate surface to make a written mark.

Ranges may be expressed herein as from "about" or "approximately" one particular value and/or to "about" or "approximately" another particular value. When such a range is expressed, another embodiment according to the invention includes from the one particular value and/or to the other particular value. Similarly, when particular values are expressed as approximations, but use of antecedents such as "about," "at least about," or "less than about," it will be understood that the particular value forms another embodiment.

Resins

In general, resins can have a variety of functions in the ink, for example, resins may be incorporated for pigment wetting within the liquid matrix, resins may be incorporated so as to aid film formation as the ink transits from a liquid to a plastic state during solvent dry, and resins may be incorporated to generate the adhesion generally required to bond pigments to various substrates.

To provide a metallic ink composition suitable for delivery via a marking instrument (e.g., a capillary-action marker), a resin component having a mean hydroxyl number between about 20 and 120 is preferably included in the ink composition.

The resin component according to the invention advantageously functions to assist in delivery of the metallic pigment as the ink composition of the invention is drawn to the nib from the fibrous ink reservoir via capillary-action and dispensed upon marking (e.g., making a written marking with the ink composition of the invention). Thus, the resin component is added to promote delivery of the metallic pigment from the capillary-action marker and is surprisingly able to effect such delivery when the mean hydroxyl number of the resin component is between about 20 and about 120, between about 20 and about 110, between about 25 and about 100, between about 25 and about 90, between about 30 and about 80, between about 35 and about 75, between about 35 and about 70, between about 35 and about 65, between about 40 and about 60, and/or between about 45 and about 55, for example, a value of about 50.

The resin component can include a hydroxylated resin as the sole resin, or the resin component can be a combination of a hydroxylated resin and one or more additional resins provided that the mean hydroxyl number is within the range of about 20 to about 120. Thus, as used herein, the resin component refers to the total resin content of the ink composition. Total resin content can generally be described as the amount of resin (i.e., low molecular weight amorphous oligomers) in aggregate contained within an ink formulation. The one or more additional resins of the resin component may comprise non-hydroxylated resins. In one class of embodiments, the resin component is substantially free of non-hydroxylated resins, i.e., the ink composition only contains one or more hydroxylated resins. In another class of embodiments, the resin component can be a combination of one or more hydroxylated resins and one or more non-hydroxylated resins such that the mean hydroxyl number is from about 20 to about 120.

As used herein, "mean hydroxyl number" refers to the effective hydroxyl number of the resin component. For example, a resin component comprising a hydroxylated resin with a hydroxyl number of about 75 and non-hydroxylated resin with a hydroxyl number of 0 in a ratio of 2:1 (hydroxylated resin to non-hydroxylated resin) has a mean hydroxyl number of about 50. In embodiments wherein the hydroxylated resin is the sole resin included in the resin component, the mean hydroxyl number is the hydroxyl number of the hydroxylated resin.

As used herein, the term "hydroxyl number" is the difference between the "hydroxyl value" and the "acid value" of a specific resin. The hydroxyl value is the number in milligrams of potassium hydroxide needed to hydrolyze the ester formed as the result of the reaction between one gram of a given hydroxylated resin and acetic anhydride. The acid value is the number in milligrams of potassium hydroxide needed to hydrolyze the carboxylic acid in one gram of resin. We have unexpectedly and surprisingly found that the hydroxyl number for a resin (even for the same lot of resin) may vary depending on when in the resin process stream the resin is tested and the storage conditions of the resins. Typically, in the instant invention, the term hydroxyl number refers to the hydroxyl number of a commercially available resin that has gone through the entire process stream and distribution chain, i.e., typically the hydroxyl number refers to the resin as received by the ink manufacturer.

Surprisingly and unexpectedly, the mean hydroxyl number of the resin component has been found to be particularly significant for obtaining consistently enhanced writing performance of capillary action markers comprising a metallic ink composition according to the invention.

For example, when a metallic ink composition comprises a resin component with a mean hydroxyl number of zero, a capillary action marker comprising said metallic ink composition delivers little to no metallic pigment to a substrate. Without intending to be bound by theory, the markers are believed to deliver little to no metallic pigment because the nib is "under-primed" with the ink composition as a result of the metallic ink pigment undesirably interacting with the fibers of the ink reservoir. The end result of such poor priming is a written trace with a low density of the metallic pigment.

Further, when the hydroxyl number of the resin is too high, for example above 120, good delivery of the metallic pigment from the capillary-action markers initially occurs but inexplicably starving such that the capillary-action markers fail to deliver sufficient fluid from the nib has been observed to occur in an unacceptably high proportion of capillary-action markers containing same. While not intending to be bound by theory, it is believed that in writing instruments containing a resin component having a mean hydroxyl number greater than about 120, the nib becomes "over-primed" with metallic pigment such that the capillary channels of the nib become clogged, thereby "starving" the marker. This phenomenon of starving can be readily detected by the consumer because of the scratchy (relatively higher friction) writing performance that occurs because insufficient ink composition is delivered from the nib to wet the substrate when a written mark is attempted with such a marker.

On the other hand, a capillary action marker comprising a metallic ink with a resin component with a mean hydroxyl number between about 20 and about 120 displays enhanced delivery of the metallic pigment to the substrate. Without intending to be bound by any particular theory, variable but still acceptable priming of the capillary-marker is observed as the mean hydroxyl number decreases below about 30 (i.e., is within the range of about 20 to about 30), and unacceptable/poor priming frequently occurs as the mean hydroxyl number decreases below about 20. Similarly, over-priming is believed to occur to a larger but still acceptable degree when the mean hydroxyl number increases above about 70 (i.e., is within the range of about 70 to about 120), and unacceptable/poor priming frequently occurs as the mean hydroxyl number increases above about 120. Thus, it is generally preferred for the mean hydroxyl number to be between about 30 and about 70, between about 35 and about 65, between about 40 and about 60, between about 45 and about 55, for example, about 55, about 50.

In order to minimize undesired interactions and/or reactions between the metallic pigments, the resin component and/or the fibers of the ink reservoir, resins (whether hydroxylated or non-hydroxylated) having low acid numbers are preferred. For example, resins having acid values less than 1.0, less than 0.70, and/or less than 0.50 are generally preferred.

In the metallic ink compositions according to the invention, the resin component is typically included in an ink in a range of about 5.0 wt % to about 35.0 wt %, about 7.5 wt % to about 30 wt %, and/or about 10 wt % to about 25 wt %, about 12 wt % to about 20 wt %, and/or about 15 wt % to about 20 wt %, for example, about 17 wt %, based on the total weight of the ink composition.

When included, a non-hydroxylated resin predominantly is present because it aids in preventing the settling of metallic particles in the nib, but the non-hydroxylated resin can also undesirably impede delivery of the pigment when present in certain (relative) amounts, particularly when the inclusion of the non-hydroxylated resin in the ink composition results in a mean hydroxyl number outside of the range of about 20 to about 120. Indeed, the hydroxylated resin can unexpectedly and advantageously substantially counteract the negative writing performance properties that can frequently occur when the non-hydroxylated resin is present as substantially the sole resin component.

As mentioned above, the hydroxylated resin advantageously functions to assist in delivery of the metallic pigment as the ink composition of the invention is drawn to the nib from the fibrous ink reservoir via capillary-action and dispensed upon marking (e.g., making a written marking with the ink composition of the invention). Thus, the hydroxylated resin is added to promote delivery of the metallic pigment from the capillary-action marker and is surprisingly able to effect such delivery even when a non-hydroxylated resin is also included in the ink composition provided that the inclusion of the non-hydroxylated resin in the ink composition results in a mean hydroxyl number within the range of about 20 to about 120.

One or more hydroxylated resins can alternatively be included in a metallic ink composition as substantially the sole resin(s) (i.e., the ink compositions in accordance with the invention can be substantially free of non-hydroxylated resins.) In the context of this invention, "substantially free of non-hydroxylated resins" means that the ink compositions contain less than about 2 wt. % of non-hydroxylated resins, less than about 1 wt. %, and/or less than about 0.20 wt. % of non-hydroxylated resins, based on the total weight of the ink composition. Thus, ink compositions containing a resin component including a single hydroxylated resin with a hydroxyl number in the range of about 20 to about 120 as the sole resin are also in accordance with the invention.

In the metallic ink compositions according to the invention, one or more hydroxylated resins are included as the sole resin(s) or in combination with one or more non-hydroxylated resins as previously described. Typically, the hydroxylated resin(s) is included in an ink in a range of about 5.0 wt % to about 35.0 wt %, about 7.5 wt % to about 30 wt %, and/or about 10 wt % to about 25 wt %, about 12 wt % to about 20 wt %, and/or about 15 wt % to about 20 wt %, for example, about 17 wt %, based on the total weight of the ink composition. Suitable hydroxylated resins include but are not limited to terpene phenolic resins, phenolic modified rosin resins, novolac resins, and combinations thereof.

In one preferred embodiment, the hydroxylated resin comprises a terpene phenolic resin. As used herein, the term "terpene phenolic resin" includes any addition product of a substituted or unsubstituted phenol with an unsaturated terpene hydrocarbon. Exemplary unsaturated terpene hydrocarbons include but are not limited to δ-2-carene, δ-3-carene, dipentene, limonene, myrcene, β-phellandrene, α-pinene, β-pinene, α-terpinene, γ-terpinene, terpinolene, and combinations thereof. The terpene phenolic resin can be a random or block oligomer.

In another embodiment, the hydroxylated resin comprises a phenolic modified rosin ester resin. As used herein, the term "phenolic modified rosin resin" refers to any rosin resin modified with phenol. Rosin is the resinous component of the exudate produced by various species of Pine. The primary components of rosin include but are not limited to abietic acid and pimaric acid. Each of these components, whether individually (particularly, abietic acid) or in combination with other Pine exudate components, can be referred to as a rosin and can be modified with a phenolic component to produce a phenolic-modified rosin resin.

In an additional embodiment, the hydroxylated resin comprises a novolac resin. As used herein, the term "novolac resin" refers to phenol-formaldehyde resins with a formaldehyde to phenol molar ratio of less than one. The polymerization of formaldehyde and phenol units is typically conducted using an acidic catalyst. The phenol units are mainly linked by methylene and/or ether groups.

Suitable hydroxylated resin components must show adequate solubility in the ink composition solvent(s). Suitable resins are characterized by solubility of at least 25% by weight in aliphatic solvents. Further, suitable resins have low number average molecular weights (Mn) in a range of about 400 to about 1000, about 450 to about 850, and/or about 500 to about 700. Suitable hydroxylated resins are available from Finjetchemical Industries (Wuzhou, China), Foreverest Resources, Ltd. (China), Arizona Chemical Company (Jacksonville, Fla.), Eastman Chemical Company (Kingsport, Tenn.), Summit Trade Pte., Ltd. (Wuzhou, China), Haixier (Xiamen) Chemical Industry Co., Ltd. (Fujian, China), Xinyi Sonyuan Chemical Co., Ltd. (Guangdong, China), Multiple Plus Co., Ltd. (Thailand), Technical Industries (Peace Dale, R.I.), Akrochem Corporation (Akron, Ohio), and Lawter Inc. (Chicago, Ill.). Exemplary commercially available resins include but are not limited to FINNOL™ 3500 (Finjetchemical Industries), SYLVARES™ TP 105 (Arizona Chemical Company), SYLVARES™ TP 2019 (Arizona Chemical Company), SYLVARES™ TP 115 (Arizona Chemical Company), SYLVARES™ TP 2040 (Arizona Chemical Company), SYLVARES™ TP 2040HME (Arizona Chemical Company), SYLVARES™ TP 2040HM (Arizona Chemical Company), SYLVARES™ TP 7042E (Arizona Chemical Company), SYLVARES™ TP 2040L0 (Arizona Chemical Company), SYLVARES™ TP 95 (Arizona Chemical Company), SYLVARES™ TP 300 (Arizona Chemical Company), SYLVARES™ TP 7042 (Arizona Chemical Company), SYLVARES™ TP 96 (Arizona Chemical Company), PENTALYN™ 702-M (Eastman Chemical Company), PENTALYN™ 765-M (Eastman Chemical Company), PENTALYN™ 780-M (Eastman Chemical Company), SUMREZ™ 3600 (Summit Trade Pte., Ltd.), TAMANOL 803L™ (Multiple Plus Co., Ltd.), TAMANOL™ 801 (Multiple Plus Co., Ltd.), TI-REZ#560 (Technical Industries), P-104 Resin (Akrochem Corporation), P-03 Resin (Akrochem Corporation), SETAPRINT™ 1200-E (Lawter Inc.), SETAPRINT™ 2404-E (Lawter Inc.), and SETAPRINT™ 8785-E (Lawter Inc.).

Suitable non-hydroxylated resins must show adequate solubility in the ink composition solvent(s). When a non-hydroxylated resin is included in a metallic ink composition as substantially the sole resin, it has been found that a clear fluid is ultimately (and thereafter irretrievably) delivered from an unacceptably high proportion of capillary-action markers containing same. Without intending to be bound by theory, it is believed that in such writing instruments the metallic pigment becomes fixed in the fibers of the ink reservoir such that the pigment remains in the ink reservoir. In view of the foregoing, the term non-hydroxylated resin as used herein (in addition to being non-hydroxylated) typically refers to a resin which when included in a metallic ink composition as substantially the sole resin, will undesirably impede or even prevent delivery of the metallic pigment from capillary-action markers containing such an ink composition such that a clear writing fluid substantially free of metallic pigment is delivered from the capillary-action markers at some point over their lifetime at an unacceptably high proportion of the capillary-action markers, for example, greater than about 50%, greater than about 60%, greater than about 70%, greater than about 80%, and/or greater than about 90%. The referenced metallic ink composition containing the non-hydroxylated resin as substantially the sole resin is of course otherwise in accordance with the invention.

The non-hydroxylated resin, if included in a metallic ink composition in accordance with the invention, is included in an amount in a range of about 0.5 wt % to about 13 wt %, about 1 wt % to about 10 wt %, about 1.5 wt % to about 8 wt %, about 2 wt % to about 6 wt %, and/or about 2 wt % to about 4 wt %, for example, about 3 wt. %, based on the total weight of the ink composition. Again, the non-hydroxylated resin(s) must be combined with one or more hydroxylated resins to provide an ink composition having a resin component with a mean hydroxyl number in the range of about 20 to about 120 according to the invention. Suitable non-hydroxylated resins include but are not limited to styrenated terpene resins, phenol free rosin resins, and combinations thereof.

In one embodiment, the non-hydroxylated resin is a styrenated terpene resin. As used herein the term "styrenated terpene resin" includes any resin produced from the copolymerization of one or more terpene hydrocarbon monomers and styrene. Exemplary terpene hydrocarbon monomers include but are not limited to δ-2-carene, δ-3-carene, dipentene, limonene, myrcene, β-phellandrene, α-pinene, β-pinene, α-terpinene, γ-terpinene, terpinolene, and combinations thereof.

In another embodiment, the non-hydroxylated resin is a phenol free rosin resin. As used herein the term "phenol free rosin resin" refers to any rosin resin not modified with phenol. Rosin is the resinous component of the exudate produced by various species of Pine. The primary components of rosin include but are not limited to abietic acid and pimaric acid. Each of these components, whether individually (particularly, abietic acid) or in combination with other Pine exudate components, can be referred to as a rosin (and thus a phenol free rosin resin). Exemplary phenol free rosin resins include but are not limited to (non-modified) rosin, maleic-modified rosin resins, and fumaric-modified resins. Phenol free rosin resins that are soluble in low aliphatic solvents (i.e., low aliphatic soluble phenol free rosin resins) are preferred.

Suitable non-hydroxylated resins are available from Finjetchemical Industries (Wuzhou, China), Foreverest Resources, Ltd. (China), Lawter Inc. (Chicago, Ill.), Arizona Chemical Company (Jacksonville, Fla.), Summit Trade Pte., Ltd. (Wuzhou, China), Haixier (Xiamen) Chemical Industry Co., Ltd. (Fujian, China), Xinyi Sonyuan Chemical Co., Ltd.

(Guangdong, China). Exemplary commercially available non-hydroxylated resins include but are not limited to FINNOL™ 3400 (Finjetchemical Industries), ECOREZ® 303A (Lawter, Inc.), SYLVARES® ZT105LT (Arizona Chemical Company), SYLVARES® ZT106LT (Arizona Chemical Company), ZONATAC® NG 98 (Arizona Chemical Company), and SUMTAC™ 9500 (Summit Trade Pte., Ltd.). U.S. Pat. No. 7,829,630, which is incorporated by reference herein in its entirety, describes styrenated terpene resins which may be used as non-hydroxylated resins in the metallic ink compositions according to the invention.

Metallic Pigments

A metallic pigment is included in the metallic ink compositions according to the invention so as to provide a shimmering, sparkle, or glitter effect (i.e., an effect produced by the multi-directional reflection of light). Suitable pigment particles include, but are not limited to, metallic pigments such as copper, zinc, aluminum, bronze, mica, oxides thereof, anodizes thereof, and combinations of any of the foregoing. Suitable metallic pigment particles are available from a number of pigment manufacturers such as, for example, US Aluminum (Flemington, N.J.), Eckart America Corporation (Painesville, Ohio), and Schlenk Metallic Pigments (Ashland, Mass.). The metallic pigment particles are typically initially provided in powder form (rather than as a paste) so as to provide greater control over the formulation. Of course, pastes can also be used.

Representative metallic pigments include but are not limited to Aluminum Leafing EM/LS/6500 (Schlenk Metallic Pigments), Aluminum Offset FM/4500 (Schlenk Metallic Pigments), Aluminum Offset FM/6500 (Schlenk Metallic Pigments), Goldbronze Offset 6129 Richgold (Schlenk Metallic Pigments), Goldbronze Offset 6340 Richgold (Schlenk Metallic Pigments), Goldbronze Offset 6229 Richgold (Schlenk Metallic Pigments), Goldbronze Offset 6327 Richgold (Schlenk Metallic Pigments), Goldbronze Offset 6234 Richgold (Schlenk Metallic Pigments), Goldbronze Offset 6129 Richpalegold (Schlenk Metallic Pigments), Goldbronze Offset 6340 Richpalegold (Schlenk Metallic Pigments), Goldbronze Offset 6229 Richpalegold (Schlenk Metallic Pigments), Goldbronze Offset 6327 Richpalegold (Schlenk Metallic Pigments), Goldbronze Offset 6234 Richpalegold (Schlenk Metallic Pigments), Goldbronze Offset 6129 Palegold (Schlenk Metallic Pigments), Goldbronze Offset 6340 Palegold (Schlenk Metallic Pigments), Goldbronze Offset 6229 Palegold (Schlenk Metallic Pigments), Goldbronze Offset 6327 Palegold (Schlenk Metallic Pigments), Goldbronze Offset 6234 Palegold (Schlenk Metallic Pigments), LITHOFLEX® ST 015 Silver (Eckart America Corporation), LITHOFLEX® ST 020 Silver (Eckart America Corporation), LITHOFLEX® XA 40 01 Rich Gold (Eckart America Corporation), LITHOFLEX® XA 40 02 Rich Pale Gold (Eckart America Corporation), and LITHOFLEX® XA 40 03 Pale Gold (Eckart America Corporation). Representative metallic pigment available as pastes include but are not limited to Goldbronze Offset FM/6129 Richgold (Schlenk Metallic Pigments), Goldbronze Offset FM/6340 Richgold (Schlenk Metallic Pigments), Goldbronze Offset FM/6229 Richgold (Schlenk Metallic Pigments), Goldbronze Offset FM/6327 Richgold (Schlenk Metallic Pigments), Goldbronze Offset FM/6234 Richgold (Schlenk Metallic Pigments), Goldbronze Offset FM/6129 Richpalegold (Schlenk Metallic Pigments), Goldbronze Offset FM/6340 Richpalegold (Schlenk Metallic Pigments), Goldbronze Offset FM/6229 Richpalegold (Schlenk Metallic Pigments), Goldbronze Offset FM/6327 Richpalegold (Schlenk Metallic Pigments), Goldbronze Offset FM/6234 Richpalegold (Schlenk Metallic Pigments), Goldbronze Offset FM/6129 Palegold (Schlenk Metallic Pigments), Goldbronze Offset FM/6340 Palegold (Schlenk Metallic Pigments), Goldbronze Offset FM/6229 Palegold (Schlenk Metallic Pigments), Goldbronze Offset FM/6327 Palegold (Schlenk Metallic Pigments), Goldbronze Offset FM/6234 Palegold (Schlenk Metallic Pigments). While the foregoing metallic pigment examples typically have satisfactory particle diameters for use in capillary-action markers containing a metallic ink composition according to the invention, it should be noted that other metallic pigments can be processed, e.g., wet sieved, to control/reduce their particle sizes in order to further optimize the performance of a capillary-action marker containing same.

In one aspect, bronze metallic pigments comprising copper/zinc alloy are used as the metallic pigment. Of course, other elements such as nickel, lead, manganese, phosphorus, and silicon can also be included in the copper/zinc alloy of the bronze pigments. In bronze metallic pigments comprising copper/zinc alloy without any additional elements, the weight ratio of copper to zinc can be suitably varied between about 50:50 and about 95:5, for example, about 90:10, between about 55:45 and about 90:10, between about 60:40 and about 80:20, for example, about 70:30, to provide "goldbronze" metallic pigments. Goldbronze metallic pigments having a copper to zinc weight ratio of about 70:30 have demonstrated particularly good performance in writing instruments, particularly capillary action markers, containing ink compositions according to the invention when the pigment to resin component ratio is held between 0.70 and 1.45, more preferably, between 0.85 and 1.30, even more preferably between 0.90 and 1.25, for example, about 1.15 as demonstrated by the examples. Similarly, goldbronze metallic pigments having a copper to zinc weight ratio of about 90:10 have demonstrated particularly good performance in writing instruments, particularly capillary action markers, containing ink compositions according to the invention when the pigment to resin component ratio is held between 1.20 and 2.0, more preferably, between 1.35 and 1.85, even more preferably between 1.40 and 1.80, for example, about 1.60 as demonstrated by the examples.

The metallic pigment typically has a density of from about 2.5 grams/cubic centimeter (g/cc) to about 12.5 g/cc, about 4 g/cc to about 11 g/cc, and more typically from about 6 g/cc to about 10 g/cc at 20° C. The surface of the metallic pigment is typically treated with a fatty acid, particularly when the pigments are metallic pigments comprising copper/zinc alloy having a substantially planar morphology. Most often, the surface of the metallic pigment is treated with a long chain (18 to 21 carbons) fatty acid such as stearic acid, oleic acid, and the like, such that long chain fatty acid molecules are associated/adsorbed to the pigment surface.

Preferably, the metallic pigment has a substantially planar morphology. Such substantially planar metallic pigments are often referred to in the industry as being corn flakes, silver dollars, or vacuum metalized pigments. Substantially planar metallic pigments are extremely thin typically having a thickness between about $1/5^{th}$ and about $1/50^{th}$ and/or between about $1/10^{th}$ and about $1/100^{th}$ of the particle diameter. Generally, the substantially planar metallic pigments have an average thickness from about 0.01 microns to about 1 micron, about 0.05 microns to about 0.50 microns, and/or about 0.08 microns to about 0.20 microns. Typically, the substantially planar metallic pigments have an average thickness of less than about 0.50 microns, less than about 0.25 microns, and/or less than about 0.10 microns.

The average dimensions of the pigment particles can be ascertained by performing scanning electron microscopy (SEM). Typically, the pigments have an average diameter of from about 0.5 microns to about 7.5 microns; preferably, the pigments have an average diameter from about 1 microns to about 5 microns; even more preferably, the pigments have an average diameter from about 2 microns to about 4 microns. These sizes are generally preferred in as much as such metallic pigments have demonstrated minimized settling in a capillary-action marker system over time, and also do not clog the nib such that the dispensation of the ink from a capillary-action marker is interrupted.

In general, the largest dimension of the pigment particles is limited by the need for the pigment particles to pass through the capillary channels in the porous nibs and fibrous reservoirs of capillary action markers and by the requirement that the pigment particles from stable suspensions that do not settle over time. The smallest dimension of the pigment particles is generally selected to limit penetration of the particles into the interstices of the intended substrate material as such penetration can diminish the intended decorative effect.

Typically, a metallic pigment is included in the ink composition in an amount of about 5 wt % to about 40 wt %, about 7.5 wt % to about 35 wt %, about 10 wt % to about 30 wt %, and/or about 12.5 wt % to about 25 wt %, for example 20 wt %, based on the total weight of the ink composition. The metallic pigment is typically included in the ink composition in an amount such that the ratio of the amount of the metallic pigment to the total amount of resin component (i.e., total of hydroxylated resin(s) plus any additional non-hydroxylated resin(s)) is between about 0.70 and about 2.0.

When the pigment to resin component ratio included in a metallic ink composition is too low, for example less than about 0.70, poor delivery of the metallic pigment from the capillary-action markers occurs. As the pigment to resin component ratio decreases below about 0.70, the capillary-action markers fail to deliver sufficient fluid from the nib in an unacceptably high proportion of the capillary-action markers containing same. Without intending to be bound by any particular theory, it is believed that in such writing instruments, the nib becomes over-primed with metallic pigment such that the porous nib becomes clogged, thereby starving the marker. The results of this phenomenon can be readily detected by the consumer because of the scratchy (relatively higher friction) writing performance that occurs because insufficient ink composition fluid is delivered from the nib to wet the substrate when a written mark is attempted.

When the pigment to resin component ratio included in a metallic ink composition is too high, for example, above 2.0, poor and/or slow priming of the capillary-action marker nib occurs. A frequent end-result of such poor priming is a written trace with an unacceptably low density of the metallic pigment. In the instance where the pigment to resin component ratio is above 2.0, it is believed that the nib is not adequately primed with the metallic pigment and that the metallic pigment becomes fixed in the ink reservoir itself because of undesirable interactions with the reservoir fibers.

Solvent(s)

The metallic ink composition may be any suitable solvent. Generally, the solvent comprises an organic solvent, for example, one or more organic hydrocarbon solvents. As a result, the solvent generally does not contain substantial amounts of water, e.g., the solvent generally contains less than about 5 wt % water, more preferably less than about 1 wt % water, and even more preferably less than 0.1 wt % water. Additionally, while aromatics may be included, for example to enhance the solubility of selected resin components, the solvent generally does not contain substantial amounts of aromatics, e.g., the solvent generally contains less than about 5 wt % aromatics, more preferably less than about 1 wt % aromatics, and even more preferably less than 0.1 wt % aromatics.

Most typically, the solvent comprises at least one aliphatic hydrocarbon solvent. The aliphatic hydrocarbon solvent(s) generally is present in an amount of about 30 wt % to about 90 wt %, about 40 wt % to about 80 wt %, and/or more preferably about 55 wt % to about 75 wt %, based on the total weight of the ink composition. The aliphatic hydrocarbon solvent generally is a liquid at room temperature, but may include aliphatic hydrocarbons which are solids or semi-solids at room temperature.

Preferably, the aliphatic hydrocarbon solvent includes at least one C5-C15 hydrocarbon and more preferably at least one C6-C12 hydrocarbon. The aliphatic hydrocarbon solvent can be a straight chain alkane, a branched alkane, a cyclic alkane, or a mixture of the foregoing. Examples of suitable C5-C15 hydrocarbon alkanes include but are not limited to pentanes, hexanes, heptanes, octanes, nonanes, decanes, undecanes, dodecanes, cyclohexane, cycloheptane, cyclooctane, methylcyclopentane, methylcyclohexane, methylcycloheptane, and mixtures of the foregoing.

Thus, the aliphatic hydrocarbon solvent can be provided as a blend of components, for example, derived from petroleum. In one aspect, the aliphatic hydrocarbon solvent is characterized by a boiling point in the range of about 40° C. to about 300° C. and more preferably from about 80° C. to about 200° C. Exemplary blended solvents include mineral spirits and naphtha solvents. The solvent preferably has a medium evaporation rate (e.g., similar to butyl acetate) from about 0.5 to about 3 and more preferably from about 0.8 to about 2.0. A preferred aliphatic hydrocarbon solvent is naphtha or low aromatics (e.g., "Rule 66") mineral spirits such as Special Naptholite, available from Citgo Petroleum of Tulsa, Okla., having an evaporation rate of 1 (butyl acetate=1).

The aliphatic hydrocarbon solvent can also include a mineral oil comprising C15-C40 hydrocarbons. Because mineral oils have relatively higher boiling points, particularly relative to the continuous phase of most metallic pigment dispersions, they are particularly useful for pasting the metallic pigments as the obtained pigment dispersion can be stored for extended periods with low risk of ignition because of its relatively increased flash point.

Marker Assemblies

The marker includes an ink reservoir disposed in a housing or barrel. The ink reservoir is in fluid communication with a porous nib. The barrel is typically sealed by a plug, which helps to keep the ink reservoir in place.

Typically, the ink reservoir and the nib are disposed in such a manner relative to each other that the ink composition can be transferred from the ink reservoir to the nib via migration as a result of the ink reservoir being in fluid communication with the nib. The ink composition generally moves by capillary-action within the reservoir, i.e., the ink composition generally moves by capillary-action from the distal end of the reservoir to the reservoir end which is proximate to the nib. Similarly, the ink composition generally moves within the nib by capillary-action, i.e., the ink composition generally moves by capillary-action from the portion of the nib which is proximate to the reservoir to the portion of the nib which is applied to a substrate to make a written mark. Loading and priming of the ink reservoirs and the nibs, respectively, can advantageously be carried out over a wide temperature range from about 0° F. to about 77° F.

According to a preferred embodiment, the ink reservoir is a wick-type reservoir, and the fibrous nib is in continuous (i.e., permanent) contact therewith. In one embodiment, the coupling zone provides a large surface area for the migration of a metallic ink composition from the reservoir to the nib (relative to the size of the nib). The coupling zone on the reservoir is usually at least about the same, at least about 1.5 times greater than, and/or at least about 2 times greater than the corresponding greatest diameter of the nib.

Capillary-action markers useful for delivering ink compositions containing metallic pigment particles comprise ink reservoirs having a relatively open structure. Suitable reservoirs for use in the markers according to the invention preferably have a reservoir fiber density less than about 0.50 g/cc, more preferably less than about 0.25 g/cc and most preferably less than about 0.10 g/cc.

The reservoir fibers can be manufactured from thermoplastic polymers such as, for example, polyesters, nylons, and mixtures thereof (provided that the fibers are insoluble in the ink composition). The fibers inside the reservoir can be linearly-oriented or entangled. To maintain the integrity of the ink reservoir towards aggressive solvents, the reservoir may be wrapped with a sheet of polypropylene, high density polyethylene, or nylon. The reservoirs can be of any dimensions as long as the dimensions are sufficient for storing a predetermined amount of ink and for permitting the reservoir to fit into the desired marker body or housing.

The nibs should be sufficiently porous to allow the metallic pigment particles to pass freely therethrough. The nib also should prevent ink compositions from leaking when the nib is downwardly disposed. Fibers of the nib should be compatible with (i.e., insoluble in) the ink composition solvent system and capable of retaining the ink composition. Suitable nib fibers can be manufactured from thermoplastic polymers such as, for example, polyesters, acrylics, nylons, and combinations thereof.

Methods of Preparing and Additives

A metallic ink composition according to the invention can be prepared by standard methods. Generally, a metallic pigment is dispersed in a first solvent or non-volatile oil, the hydroxylated resin and any optional non-hydroxylated resin are dissolved in a second solvent (sometimes referred to as a "letdown" solvent) which can be the same or different from the first solvent, and then the two mixtures are combined and additional letdown solvent can be added to adjust the ink composition viscosity. A capillary-action marker containing the inventive ink composition can then be prepared according to standard processing methods.

The viscosity of the metallic ink compositions at 25° C. is usually less than about 40 centipoises (cps), less than about 25 cps, and/or less than about 10 cps, for example, about 1 cps to about 40 cps, about 1 cps to about 25 cps, about 1 cps to about 10 cps, about 1.5 cps to about 5 cps, for example, about 2 cps. However, the ranges provided above can shift higher or lower, depending on the nature and porosity of the nibs and the fiber density of the ink reservoirs used in the markers according to the disclosure.

The ink may optionally contain other additives such as, for example, surface tension modifier(s), other synergic resin(s), surfactant(s), non-volatile solvent(s), dispersing agent(s), and other additives known in the art. These additives can be added to the ink compositions in an amount such that the overall performance of the ink compositions is not adversely affected in any aspect. In addition, even if one or more additive resin is included, the pigment to resin component ratio is maintained within the range described above.

The ink compositions and writing instruments in accordance with the disclosure can be better understood in light of the following examples, which are merely intended to illustrate the markers and ink compositions and are not meant to limit the scope thereof in any way.

EXAMPLES

Method of Determining Resin Hydroxyl Number

The hydroxyl value is the number in milligrams of potassium hydroxide needed to hydrolyze the ester formed as the result of the reaction between one gram of a specific resin and acetic anhydride. The acid value is the number in milligrams of potassium hydroxide needed to hydrolyze the carboxylic acid in one gram of a specific resin. The hydroxyl number is the difference between the hydroxyl value and the acid value. Hydroxyl numbers for the same resin are generally consistent but may vary slightly depending on when in the resin process stream the testing is done and storage conditions of the resins. Accordingly, as used herein, "hydroxyl number" refers to the hydroxyl number of a commercially available resin that has gone through the entire process stream and distribution chain. Typically, the term "hydroxyl number" refers to the hydroxyl number of a commercially available resin that has gone through the entire process stream and distribution chain, i.e., typically the hydroxyl number refers to the resin as received by the ink manufacturer.

The hydroxyl value of the resin was determined by an outside laboratory (Chemir/Evans Analytical Group, MO) as follows: Approximately 3 grams of resin, weighed to the tenths of a milligram, was weighed into an Erlenmeyer flask. 5 mL of a 1:3 (v/v) acetic anhydride: anhydrous pyridine solution was added to the resin. The flask was fit with a condenser and heated in a boiling water bath for 1 hr. 10 mL of de-ionized water was then added through the condenser to the mixture, and the resulting mixture was heated in the boiling water bath for 10 min. The Erlenmeyer flask was then removed from the water bath and allowed to cool to room temperature. 15 mL of n-butanol were added to the mixture through the condenser. The condenser was removed and the Erlenmeyer wall was washed with 10 mL of n-butanol. 25 mL of toluene was added to the mixture to dissolve any yellow mass which may have formed upon the addition of the n-butanol. A clear, yellow mixture was formed with a small, less intensely colored layer on the bottom. 5 drops of 1% phenolphthalein in HPLC grade ethanol solution was added to the mixture. The yellow solution was then titrated with potassium hydrogen phthalate ("KHP") standardized ethanolic KOH solution to the faint pink phenolphthalein endpoint and the volume of KOH titrant used was recorded.

A blank of the acetic anhydride/anhydrous pyridine solution was prepared and titrated according to the above procedure, with the exception that no resin was added to the flask. The hydroxyl number was calculated using the following equation:

$$\text{Hydroxyl Number} = \frac{(\text{Blank mL KOH} - \text{Sample mL KOH})(\text{KOH Normality})\left(\frac{56.1 \text{ g}}{\text{mol}}\right)}{\text{Sample wt. in grams}}$$

The acid number was determined as follows: Approximately 2.5 grams of resin, weighted to tenths of a milligram, was weighed into an Erlenmeyer flask and mixed with 10 mL of reagent grade toluene and 10 mL of HPLC grade absolute ethanol to obtain a homogeneous solution. 3 drops of 1% phenolphthalein in HPLC grade ethanol solution was added to the solution and the solution was titrated with KHP standardized ethanolic KOH solution to a faint pink phenolphthalein endpoint. The volume of KOH titrant used was recorded. The acid number was calculated using the following equation:

$$\text{Acid Number} = \frac{(\text{Sample mL KOH})(\text{KOH Normality})\left(56.1\frac{g}{mol}\right)}{\text{Sample wt. in grams}}$$

GC-MS Analysis and Elemental Analysis of Resins

Previous ink compositions were found to give variable performance even when the same components (i.e., the ink compositions contained the same exact components) were used. Thus, for example, we found that one batch of ink performed well whereas a second batch of ink containing identical components (as further described below) demonstrated relatively poor performance. Spectroscopic analysis of different resin lots and ink composition supernatant fluids (everything other than the metallic pigments) was performed to investigate why certain metallic ink compositions which contained the same resin (but different lots of resin, solvent, and pigment) performed better than others. As described below, the resin solutions and the supernatant solutions underwent GC-MS analysis to determine if the resins and/or the supernatant solutions contained variable amounts of oxygenated compounds or alcoholic impurities. Elemental analysis was also conducted on the resins to determine if the resins and/or the supernatant solutions contained variable amounts of oxygenated compounds or alcoholic impurities.

All sample liquids were analyzed by an Agilent GC-MSD with a 30 meter 250 micron ID DB5 column at a constant flow of 1 ml/min. A 0.1 microliter of sample is injected onto a Split/Splitless injection port at 200° C. with 200:1 split ratio. The temperature program is 30 minutes at 30° C., 2° C./min to 100° C. for 2 min, and 20° C./min to 200° C. for 1 min. Mass spectra are collected at a mass range from 20 to 220. A RGO244 oxygenate standard is used to affirm the qualitative identification of 16 oxygen-containing compounds.

There were no visible difference among chromatograms and no oxygenated compounds were found. Thus, GC-MS analysis of the different metallic ink composition supernatants and the resin lots did not reveal any differences. Thus, the analyses provided no insight into the variable performance of the ink compositions.

The percent of oxygen in various resins were determined using a pyrolysis/gravimetric determination method. The % O for various resins are shown in the Table, 1 below. The %O values listed in the table indicate that the resins have similar levels of oxygen, and thus no one resin has excessive contamination with alcohols.

TABLE 1

| Hydroxyl ("OH") number of resin sample | % O | |
|---|---|---|
| 50.18 | 6.41 | 6.06 |
| 31.17 | 6.06 | 6.33 |
| 48.61 | 6.46 | 6.30 |

Elemental analysis of the resin lots also did not reveal any differences between the resin lots. Thus, the elemental analyses also provided no insight into the variable performance of the ink compositions.

Surprisingly and unexpectedly, the mean hydroxyl number of the resin component has been found to be particularly significant for obtaining consistently enhanced writing performance of capillary action markers comprising a metallic ink composition according to the invention, provided the hydroxyl number is held in the range between about 20 and about 120. Additionally, surprisingly and unexpectedly, the pigment to resin component ratio has also been found to particularly significant for obtaining consistently enhanced writing performance of capillary action markers comprising a metallic ink composition according to the invention, provided the pigment to resin component ratio is held in the range between about 0.70 and about 2.0.

TABLE 2

| Component | Function | 1 | 2 | 3 | 4 | 5 | 6 | 7 | 8 |
|---|---|---|---|---|---|---|---|---|---|
| Goldbronze metallic pigment | Metallic effect pigment, Cu to Zn wt. ratio of about 70:30 | 20.0 | 20.0 | 20.0 | 20.0 | 20.0 | 20.0 | 20.0 | 20.0 |
| Drakesol 220 | Dedusting oil | 3.5 | 3.5 | 3.5 | 3.5 | 3.5 | 3.5 | 3.5 | 3.5 |
| Naphtha | Aliphatic solvent (let-down solvent) | 4.00 | 4.00 | 4.00 | 4.00 | 4.00 | 4.00 | 4.00 | 4.00 |
| Naphtha | Aliphatic solvent (resin solution solvent) | 55.1 | 55.1 | 55.1 | 0.00 | 0.00 | 55.1 | 55.1 | 55.1 |
| Methyl cyclohexane | Aliphatic solvent (resin solution solvent) | 0.00 | 0.00 | 0.00 | 55.1 | 55.1 | 0.00 | 0.00 | 0.00 |
| Terpene phenolic resin | Hydroxylated resin | 17.4 | 17.4 | 17.4 | 17.4 | 17.4 | 7.0 | 4.64 | 0.00 |
| Hydroxyl number ("OH") | | 53.51 | 74.30 | 31.17 | 50.18 | 128.0 | 74.3 | 74.3 | 74.3 |

TABLE 2-continued

| Component | Function | 1 | 2 | 3 | 4 | 5 | 6 | 7 | 8 |
|---|---|---|---|---|---|---|---|---|---|
| Styrenated terpene resin | Non-hydroxylated resin | 0.00 | 0.00 | 0.00 | 0.00 | 0.00 | 10.4 | 12.76 | 17.4 |
| Mean hydroxyl number | | 53.51 | 74.3 | 31.43 | 50.46 | 128 | 30 | 20 | 0 |
| Pigment to Resin Component ratio ("P/B") | | 1.15 | 1.15 | 1.15 | 1.15 | 1.15 | 1.15 | 1.15 | 1.15 |

TABLE 3

| Component | Function | 9 | 10 | 11 | 12 | 1 | 13 | 9 |
|---|---|---|---|---|---|---|---|---|
| Goldbronze metallic pigment about 70:30 | Metallic effect pigment, Cu to Zn wt. ratio of | 20.0 | 20.0 | 20.0 | 20.0 | 20.0 | 20.0 | 20.0 |
| Drakesol 220 | Dedusting oil | 3.5 | 3.5 | 3.5 | 3.5 | 3.5 | 3.5 | 3.5 |
| Naphtha | Aliphatic solvent ("let-down solvent") | 0.00 | 6.00 | 13.40 | 19.50 | 4.00 | 10.00 | 24.50 |
| Naphtha | Aliphatic solvent (resin solution) | 51.00 | 47.00 | 42.06 | 38.00 | 55.10 | 50.50 | 39.52 |
| Terpene phenolic resin | Hydroxylated resin | 25.50 | 23.50 | 21.00 | 19.00 | 17.40 | 16.00 | 12.48 |
| Pigment to Resin Component ratio ("P/B") | | 0.8 | 0.85 | 0.95 | 1.05 | 1.15 | 1.25 | 1.60 |

TABLE 4

| Component | Function | 15 | 16 |
|---|---|---|---|
| Goldbronze metallic pigment | Metallic effect pigment, Cu to Zn wt. ratio of about 90:10 | 20.0 | 20.0 |
| Drakesol 220 | Dedusting oil | 3.5 | 3.5 |
| Naphtha | Aliphatic solvent ("let-down solvent") | 24.50 | 4.00 |
| Naphtha | Aliphatic solvent (resin solution) | 39.52 | 55.10 |
| Terpene phenolic resin | Hydroxylated resin | 12.48 | 17.40 |
| Pigment to Resin Component ratio (P/B) | | 1.60 | 1.15 |

Example 1

P/B=1.15, OH=53.51

A gold ink was prepared with the ingredients identified in Table 2, above, in the amounts shown.

The resin component was dissolved in a first portion of naphtha and the solution was stirred. In a separate vessel, the gold pigment was dispersed in a dedusting oil. The gold pigment dispersion was added to the resin mixture solution, and diluted with additional naphtha (referred to as "let-down solvent" above). Mixing was continued until the gold pigment particles were evenly distributed in the mixture.

The ink composition was loaded into markers equipped with an ink reservoir and a porous nib and were allowed to stabilize overnight. Bright gold traces containing high densities of gold particles were produced when markers containing these ink compositions were used to make written marks on paper. These markers demonstrated that markers containing ink compositions according to the invention with a pigment to resin component ratio of about 1.15 and a mean hydroxyl number between about 30 and 70 provide superior uniform delivery of the metallic ink composition, with no evidence of clogging of the nib.

Examples 2-8

PB=1.15

Gold inks were prepared with the ingredients identified in Table 2, above, in the amounts shown. The procedure of Example 1 was followed, except that the mean hydroxyl number was varied.

Example 2

OH=74.3

When markers containing this metallic ink composition were used, bright gold traces containing high densities of gold particles were initially produced when markers containing these ink compositions were used to make written marks on paper. However, some of the nibs became clogged and those capillary-action markers failed to deliver sufficient fluid from the nib. The variable performance of this marker shows that increasing the mean hydroxyl value of the resin component above 70 in a marker containing a metallic ink composition can significantly affect the capability for delivering the metallic pigment particles from the marker.

Example 3

OH=31.43

When markers containing this ink composition were used, used, bright gold traces containing high densities of gold particles were produced when markers containing these ink compositions were used to make written marks on paper.

Example 4

OH=50.46

This example differs from Example 1 in that a different let-down solvent was used. When markers containing this ink composition were used, bright gold traces containing high densities of gold particles were produced when markers containing these ink compositions were used to make written marks on paper.

Comparative Example 5

OH=128

The same solvent from the Example 4 was also used in this example. When markers containing this ink composition were used, scratchy writing performance was observed and insufficient ink composition fluid was delivered presumptively because of over-priming of the nib by the ink composition according to this example. The unacceptable performance of this marker shows that increasing the hydroxyl value of the resin component in a marker containing a metallic ink composition can significantly affect the capability for delivering the metallic pigment particles from the marker.

Example 6

OH=30

In this example, the metallic ink composition included two resins, a hydroxylated resin and a non-hydroxylated resin. When markers containing this ink composition were used, bright gold traces containing high densities of gold particles were produced when markers containing these ink compositions were used to make written marks on paper.

Example 7

OH=20

In this example, the metallic ink composition again included two resins, a hydroxylated resin and a non-hydroxylated resin. When markers containing this ink composition were used, a faint gold trace, relative to the trace of Example 1, was produced in a number of markers while other markers produce a bright gold trace with a high density of metallic particles. In this example, the metallic pigment particles were not always uniformly dispensed from the marker, presumably due to increased undesirable and prolonged interaction within the reservoir and consequent failure to adequately prime the marker. Variable, but still acceptable priming of the capillary-marker is observed in the aggregate, however. Relative to markers containing ink compositions having a resin component with a mean hydroxyl number between about 30 and about 70, this marker did not demonstrate enhanced writing performance as consistently or as well. The variable performance of this marker shows that decreasing the hydroxyl value of the resin component below 30 in a marker containing a metallic ink composition can significantly affect the capability for delivering the metallic pigment particles from the marker.

Comparative Example 8

OH=0

A gold ink was prepared with the ingredients identified in Table 2, above, in the amounts shown. The procedure of Examples 7 was followed, except that a resin component with a mean hydroxyl number of zero was used. When a marker containing this ink composition was used, a faint gold trace was produced with a substantially lower density of gold particles relative to the written markings of Examples 1. In this example, the ink composition containing the non-hydroxylated resin as substantially the sole resin component resulted in delivery of minimal metallic pigment. This example shows that a capillary action marker comprising a metallic ink with a resin component with a mean hydroxyl number of zero delivers little to no metallic pigment to a substrate because the nib is not properly "primed" with the ink composition. The end result of poor priming is a written trace with a low density of the metallic pigment. The unacceptable performance of this marker shows that including non-hydroxylated resin can significantly affect the capability for delivering the metallic pigment particles from the marker, particularly when sufficient hydroxylated resin is not included in order to provide a resin component having a mean hydroxyl number between about 20 and 120, e.g., when a non-hydroxylated resin is present as substantially the sole resin component in the capillary action markers.

These examples show that capillary action markers comprising a metallic ink with a resin component with a mean hydroxyl number between about 20 and about 120 display superior delivery of the metallic pigment to the substrate. As the mean hydroxyl number decreases below about 30 (i.e., is within the range of about 20 to about 30), variable but still acceptable priming of the capillary-marker is observed, and an unacceptable priming occurred as the mean hydroxyl number decreases below about 20. Similarly, over-priming occurred to a larger but still acceptable degree when the mean hydroxyl number increased above about 70 (i.e., is within the range of about 70 to about 120), and the writing performance of markers was unacceptable because of over-priming as the mean hydroxyl number increased above about 120.

Examples 9-14

Gold inks were prepared with the ingredients identified in Table 3, above, in the amounts shown. The procedure of Example 1 is followed, except that the pigment to resin component ratio was varied. These examples describe ink compositions comprising a metallic pigment comprising a copper/zinc alloy with a copper to zinc weight ratio of 70:30 and including a hydroxylated resin having a hydroxyl number of about 50.

Example 9

P/B=0.80

When a marker containing this ink composition was used, a bright gold trace with a high density of gold particles, of a similar intensity as the trace produced in Example 1, was produced when a written mark was made.

Example 10

P/B=0.85

When a marker containing this ink composition was used, a bright gold trace with a high density of gold particles, of a similar intensity as the trace produced in Example 1, was initially produced when a written mark was made. During write testing, written markings began to fade slightly and deliver a lower density of gold particles in some of the markers.

Example 11

P/B=0.95

When a marker containing this ink composition was used, a bright gold trace with a high density of gold particles, of a similar intensity as the trace produced in Example 1, was initially produced when a written mark was made. During write testing, written markings began to fade slightly and deliver a lower density of gold particles, in some of the markers.

Example 12

P/B=1.05

When a marker containing this ink composition was used, a bright gold trace with a high density of gold particles, of a similar intensity as the trace produced in Example 1, was produced when a written mark was made. Good writing performance was demonstrated throughout write testing.

Example 13

P/B=1.25

When a marker containing this ink composition was used, a bright gold trace with a high density of gold particles, of a similar intensity as the trace produced in Example 1, was produced when a written mark was made. Very good writing performance was demonstrated throughout write testing.

Example 14

P/B=1.6

When a marker containing this ink composition was used, a bright gold trace with a high density of gold particles, of a similar intensity as the trace produced in Example 1, was initially produced when a written mark was made. During write testing, written markings became faint with a lower density of gold particles (as fading began to occur due to the metallic pigment becoming fixed in the reservoir) in an unacceptable portion of the markers. This example shows that a capillary action marker with a pigment to resin component ratio that is too high for the metallic ink composition delivers little to no metallic pigment to a substrate because the nib is not properly "primed" with the ink composition.

These examples show that markers comprising inks with metallic pigments having a copper to zinc weight ratio of about 70:30 have particularly good performance when the pigment to resin component ratio is held between about 0.80 and 1.45, particularly 0.95 to 1.25. These examples further show that as the pigment to resin component increases significantly above 1.45, poor delivery of the metallic pigment from the capillary-action markers occurs more frequently, likely due to poor and/or slow priming of the capillary-action marker nib. A frequent end-result of such poor priming is a written trace with an unacceptably low density of the metallic pigment.

Examples 15-16

Metallic ink compositions were prepared with the ingredients identified in Table 4, above, in the amounts shown. The procedure of Example 1 is followed, and that the pigment to resin component ratio was varied between Examples 15 and 16. These examples describe ink compositions comprising a metallic pigment comprising a copper/zinc alloy with a copper to zinc weight ratio of 90:10 and including a hydroxylated resin having a hydroxyl number of about 50.

Example 15

P/B=1.60

When markers containing this ink composition were used, bright gold traces containing high densities of gold particles were produced when markers containing these ink compositions were used to make written marks on paper.

Example 16

P/B=1.15

When a marker containing this ink composition was used, a bright gold trace with a high density of gold particles, of a similar intensity as the trace produced in Example 15, was initially produced when a written mark was made. During write testing, written markings became faint with a lower density of gold particles (as starving began to occur) in an unacceptable portion of the markers. Over-priming of the nib was observed, leading to starving in an unacceptable high proportion of capillary-action markers containing same.

These examples support that markers comprising inks with metallic pigments having a copper to zinc weight ratio of about 90:10 have particularly good performance when the pigment to resin component ratio is held between about 1.2 and 2.0, particularly between 1.40 and 1.80. These examples further show that as the pigment to resin component ratio decreases below 1.2, over-priming of the capillary-action markers occurs more frequently, leading to undesirably clogged nibs such that the markers fail to deliver sufficient fluid from the nib.

What is claimed:
1. An ink composition comprising:
(a) an organic solvent;
(b) a metallic pigment dispersed in the solvent;
(c) a resin component dissolved in the solvent,
wherein the ink composition has a pigment to resin component ratio between about 0.70 and about 2.00, and the resin component has a mean hydroxyl number between about 20 and about 120, and wherein the resin component comprises one or more hydroxylated resins selected from the group consisting of phenolic-modified rosin resins, terpene phenolic resins, novolac resins, and mixtures thereof.
2. The ink composition of claim 1, wherein the organic solvent is an aliphatic hydrocarbon solvent.

3. The ink composition of claim 2, wherein the aliphatic hydrocarbon solvent comprises one or more alkane hydrocarbons of length C5-C15.

4. The ink composition of claim 2, wherein the aliphatic hydrocarbon solvent comprises one or more alkane hydrocarbons of length C15-C40.

5. The ink composition of claim 1, wherein the metallic pigment comprises a metallic pigment selected from the group consisting of copper, zinc, aluminum, bronze, mica, oxides thereof, anodizes thereof, and combinations thereof.

6. The ink composition of claim 1, wherein the metallic pigment comprises a copper/zinc alloy.

7. The ink composition of claim 6, wherein the metallic pigment comprising the copper/zinc alloy has a weight ratio of copper to zinc between about 50:50 and about 95:5.

8. The ink composition of claim 6, wherein the metallic pigment has a weight ratio of copper to zinc of about 70:30 and the ink composition has a pigment to resin component ratio between about 0.70 and 1.45.

9. The ink composition of claim 6, wherein the metallic pigment has a weight ratio of copper to zinc of about 90:10 and the ink composition has a pigment to resin component ratio between about 1.20 and about 2.0.

10. The ink composition of claim 1, wherein the metallic pigment has an average density between about 2.5 grams/cubic centimeter (g/cc) and about 12.5 g/cc at 20° C.

11. The ink composition of claim 1, wherein the metallic pigment has a substantially planar morphology.

12. The ink composition of claim 1, wherein the metallic pigment has an average thickness between about 0.01 microns and about 1 micron.

13. The ink composition of claim 1, wherein the metallic pigment has an average diameter between about 0.5 microns and about 7.5 microns.

14. The ink composition of claim 1, wherein the surface of the metallic pigment has been treated with a long chain fatty acid comprising 18 to 21 carbons.

15. The ink composition of claim 1, wherein the metallic pigment is present in an amount between about 5 wt % and about 40 wt %, based on the total weight of the ink composition.

16. The ink composition of claim 1, wherein the ink composition has a total resin content between about 5 wt % and about 35 wt %, based on the total weight of the ink composition.

17. The ink composition of claim 1, wherein the resin component is substantially free of non-hydroxylated resins.

18. The ink composition of claim 1, wherein the resin component further comprises one or more non-hydroxylated resins.

19. The ink composition of claim 18, wherein the non-hydroxylated resin is selected from the group consisting of styrenated terpene resins and phenol-free rosin resins.

20. A marker comprising:
an ink reservoir and a porous nib,
the ink reservoir containing an ink composition comprising:
 (a) an organic solvent;
 (b) a metallic pigment dispersed in the solvent;
 (c) a resin component dissolved in the solvent,
wherein the ink composition has a pigment to resin component ratio between about 0.70 and about 2.00, and the resin component has a mean hydroxyl number between about 20 and about 120.

21. A method of making a written mark, comprising:
providing a capillary-action marker comprised of an ink reservoir and a porous nib, the reservoir containing an ink composition comprising:
 (a) an organic solvent;
 (b) a metallic pigment dispersed in the solvent;
 (c) a resin component dissolved in the solvent,
wherein the ink composition has a pigment to resin component ratio between about 0.70 and about 2.00, and the resin component has a mean hydroxyl number between about 20 and about 120, and
contacting the nib of the capillary-action marker to a substrate surface to make a written mark.

22. The marker of claim 20, wherein the organic solvent is an aliphatic hydrocarbon solvent.

23. The marker of claim 22, wherein the aliphatic hydrocarbon solvent comprises one or more alkane hydrocarbons of length C5-C15.

24. The marker of claim 22, wherein the aliphatic hydrocarbon solvent comprises one or more alkane hydrocarbons of length C15-C40.

25. The marker of claim 20, wherein the metallic pigment comprises a metallic pigment selected from the group consisting of copper, zinc, aluminum, bronze, mica, oxides thereof, anodizes thereof, and combinations thereof.

26. The marker of claim 20, wherein the metallic pigment comprises a copper/zinc alloy.

27. The marker of claim 26, wherein the metallic pigment comprising the copper/zinc alloy has a weight ratio of copper to zinc between about 50:50 and about 95:5.

28. The marker of claim 26, wherein the metallic pigment has a weight ratio of copper to zinc of about 70:30 and the ink composition has a pigment to resin component ratio between about 0.70 and 1.45.

29. The marker of claim 26, wherein the metallic pigment has a weight ratio of copper to zinc of about 90:10 and the ink composition has a pigment to resin component ratio between about 1.20 and about 2.0.

30. The marker of claim 20, wherein the metallic pigment has an average density between about 2.5 grams/cubic centimeter (g/cc) and about 12.5 g/cc at 20° C.

31. The marker of claim 20, wherein the metallic pigment has a substantially planar morphology.

32. The marker of claim 20, wherein the metallic pigment has an average thickness between about 0.01 microns and about 1 micron.

33. The marker of claim 20, wherein the metallic pigment has an average diameter between about 0.5 microns and about 7.5 microns.

34. The marker of claim 20, wherein the surface of the metallic pigment has been treated with a long chain fatty acid comprising 18 to 21 carbons.

35. The marker of claim 20, wherein the metallic pigment is present in an amount between about 5 wt % and about 40 wt %, based on the total weight of the ink composition.

36. The marker of claim 20, wherein the ink composition has a total resin content between about 5 wt % and about 35 wt %, based on the total weight of the ink composition.

37. The marker of claim 20, wherein the resin component comprises one or more hydroxylated resins selected from the group consisting of phenolic-modified rosin resins, terpene phenolic resins, novolac resins, and mixtures thereof.

38. The marker of claim 20, wherein the resin component is substantially free of non-hydroxylated resins.

39. The marker of claim 20, wherein the resin component further comprises one or more non-hydroxylated resins.

40. The marker of claim 39, wherein the non-hydroxylated resin is selected from the group consisting of styrenated terpene resins and phenol-free rosin resins.

* * * * *